(12) United States Patent
Keightley (10) Patent No.: US 9,884,373 B2
(45) Date of Patent: Feb. 6, 2018

(54) HOLE SAW WITH INTERCHANGEABLE CUTTING BLADES

(71) Applicant: Kym John Keightley, Fairview Park (AU)

(72) Inventor: Kym John Keightley, Fairview Park (AU)

( * ) Notice: Subject to any disclaimer, the term of this patent is extended or adjusted under 35 U.S.C. 154(b) by 0 days.

(21) Appl. No.: 14/840,242

(22) Filed: Aug. 31, 2015

(65) Prior Publication Data

US 2015/0367425 A1   Dec. 24, 2015

Related U.S. Application Data

(63) Continuation-in-part of application No. 12/514,902, filed as application No. PCT/AU2007/001748 on Nov. 14, 2007, now Pat. No. 9,120,162.

(30) Foreign Application Priority Data

Nov. 14, 2006  (AU) ................................ 2006906340

(51) Int. Cl.
  *B23B 51/04*   (2006.01)
  *B23B 51/12*   (2006.01)

(52) U.S. Cl.
  CPC ...... *B23B 51/0406* (2013.01); *B23B 51/0473* (2013.01); *B23B 51/126* (2013.01); *B23B 51/0466* (2013.01); *B23B 2251/02* (2013.01); *Y10T 408/895* (2015.01)

(58) Field of Classification Search
  CPC ............ B23B 51/0406; B23B 51/0466; B23B 51/0473; Y10T 408/895; Y10T 408/8957; Y10T 408/896; E05C 1/00; E05C 1/002; E05C 1/004

USPC ......... 408/204, 206, 207; 292/137, 150, 302
See application file for complete search history.

(56) References Cited

U.S. PATENT DOCUMENTS

| | | | |
|---|---|---|---|
| 3,162,067 A * | 12/1964 | Koons | ................... B23B 29/326 408/206 |
| 3,262,474 A | 7/1966 | Enders | |
| 3,382,743 A | 5/1968 | Trevathan | |
| 3,854,840 A | 12/1974 | Miyanaga | |
| 4,072,441 A | 2/1978 | LaPointe | |
| 4,303,357 A | 12/1981 | Makar | |
| 5,054,971 A * | 10/1991 | Kieninger | ................. B26F 1/32 408/144 |
| 5,167,475 A | 12/1992 | Miyanaga | |

(Continued)

FOREIGN PATENT DOCUMENTS

| | | | | |
|---|---|---|---|---|
| DE | 10357505 B4 * | 9/2005 | ........... | E21B 17/046 |
| EP | 0909870 A1 * | 4/1999 | ........... | B23B 31/113 |

(Continued)

*Primary Examiner* — Sunil K Singh
*Assistant Examiner* — Michael Vitale
(74) *Attorney, Agent, or Firm* — Sand & Sebolt (57) ABSTRACT

A hole saw having a blade portion separable into two parts which when separated form a base portion and a tip portion. The base and the tip have correspondingly shaped apertures and lugs that co-operate together to hold the blade tip in place. A locking means further assists in ensuring that the blade tip remains locked to the base and includes a sliding latch that engages an aperture in the blade and the base and is itself locked in place to thereby lock the blade to the base. An intermediate portion also allows for the hole saw to drill through different depths.

10 Claims, 7 Drawing Sheets

(56) References Cited

U.S. PATENT DOCUMENTS

| | | |
|---|---|---|
| 6,705,807 B1 | 3/2004 | Rudolph et al. |
| 6,786,684 B1 * | 9/2004 | Ecker .................. B23B 51/0406 408/204 |
| 7,134,815 B2 | 11/2006 | Steer |
| 2007/0020056 A1 * | 1/2007 | Burdick .............. B23B 51/0426 408/204 |

FOREIGN PATENT DOCUMENTS

| | | |
|---|---|---|
| JP | 59107815 | 6/1984 |
| JP | 59214506 | 12/1984 |
| JP | 02167613 | 6/1990 |
| JP | 04075812 | 3/1992 |
| JP | 08090325 A * | 4/1996 |
| JP | 2002120218 A * | 4/2002 |
| JP | 2003103410 A * | 4/2003 |

\* cited by examiner

HOLE SAW WITH INTERCHANGEABLE CUTTING BLADES

CROSS REFERENCE TO RELATED APPLICATIONS

This application is a continuation-in-part of U.S. patent application Ser. No. 12/514,902, which is a National Stage of International Application No. PCT/AU2007/001748 filed Nov. 14, 2007, which claims priority to AU 2006906340 filed Nov. 14, 2006; the disclosures of which are incorporated herein by reference.

FIELD OF THE INVENTION

The present invention relates to a hole saw with interchangeable cutting or drilling blades. In particular, a hole saw adapted to receive a plurality of cutting blades of different cutting configurations.

BACKGROUND OF THE INVENTION

Hole saws are a very widely used tool for many applications. Typically a hole saw includes a flat solid base that is locked by a drill, the base providing support for the hole saw. Some bases include multiple diameter grooves adapted to accommodate hole saws of different diameters. Typically these bases, with a plurality of concentric grooves, are of a diameter greater than the hole saw blade and as a result drilling depth is limited to the length of the hole saw body portion. This limitation restricts the possible uses of the hole saw and possible surfaces able to be drilled.

Other hole saws are single sized, overcoming the above-mentioned problem of a larger diameter base but requiring the user to change the entire hole saw for each application. A user with a single sized hole saw needs to replace the hole saw for each surface being drilled as well as for each different diameter hole. The removal and installation of hole saw bodies for each new application or following the failure of a hole saw blade is troublesome, labour intensive, and time consuming.

Holes saw blades use different cutter materials and configurations to more effectively cut the surface being drilled. For example, serrated carbide tipped hole saws are generally used to drill harder and more abrasive surfaces than is possible with a regular steel blade. Some composite woods are more effectively cut with a different blade configuration and are best cut with a single tooth carbide tipped cutting element. Abrasive materials such as glass, ceramics, stone, asbestos and some plastic surfaces also require different cutting materials and configuration of the hole saw blade. A diamond or carbide grit encrusted blade is typically used in these applications. As each application may require a different hole saw blade configuration, the user is required to maintain an inventory of different hole saws for each surface to be drilled and each diameter of hole, inclusive of back up hole saw bodies in the event of blade failure. Such a large inventory is both cumbersome and expensive.

In addition where different depth holes need to be drilled the user has to have an extensive hole saw inventory with hole saws of different lengths that can drill through different depths. When the hole saw wears out the whole hole saw has to be replaced at great expense.

It is therefore an object of the present invention to overcome the aforementioned problems and to provide the public with a useful alternative.

SUMMARY OF THE INVENTION

Therefore in one form of the invention there is proposed a hole saw including a base and a blade extending from the base and adapted to engage an arbor, the blade including a cylindrical skirt extending longitudinally from the base, the skirt divided into two parts along the longitudinal axis, the parts releasably lockable to each other, the first part coupled to the base and the second part having a cutting means.

In a preferred embodiment there is proposed a hole saw including a base adapted to engage an arbor and extending therefrom a cylindrical blade having at one end a cutting face, said cylindrical blade further comprising a radial slit about its circumference, said radial slit extending through the blade and separable into two main sections, the first section being a cutting tip cylinder and the second being a support cylinder that is attached to said base.

Preferably said hole saw further includes a releasable locking means to releasably lock the cutting tip cylinder to the support cylinder.

Preferably said locking means includes at least one locking member moveable from a first unlocked position to a second locked position whereby in said first position said cutting tip cylinder may be removed from the support cylinder and when in said second position said support cylinder and said cutting tip cylinder are lockingly engaged.

Preferably said support cylinder and locking member inner and outer circumferences do not protrude radially from the inner and outer circumferences of the cutting tip cylinder.

Preferably said locking member is a lug adapted to extend from the support cylinder into a correspondingly shaped locking cavity in the cutting tip cylinder.

Preferably said support cylinder includes a number of circumferential teeth adapted to engage correspondingly shaped cavities in the cutting tip cylinder, the teeth adapted to engage the cavities upon rotational movement between the two cylinders whereupon said lug is then in a position to engage the locking cavity.

An advantage of such an interchangeable hole saw blade arrangement is that a hole saw blade may be rapidly removed and reattached.

Still a further advantage is that by utilising such a removably attachable hole saw blade portion a user requires less room to store a plurality of hole saw blades for different applications.

Still a further advantage is that said hole saw body can be used with commonly available hole saw mandrels.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings.

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention.

Figure 1A:
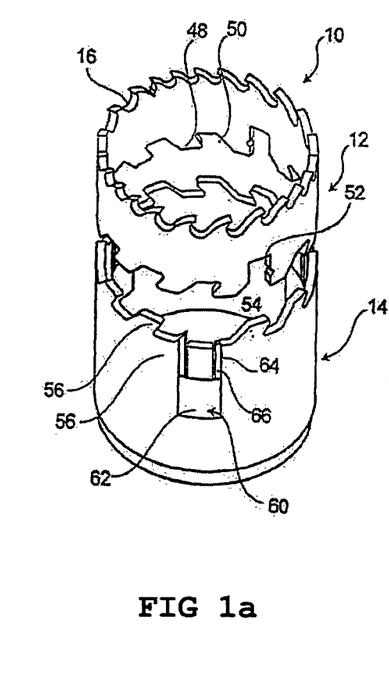
FIG. 1a illustrates a perspective view of a hole saw body and a hole saw blade in a disengaged position.
Figure 1B:
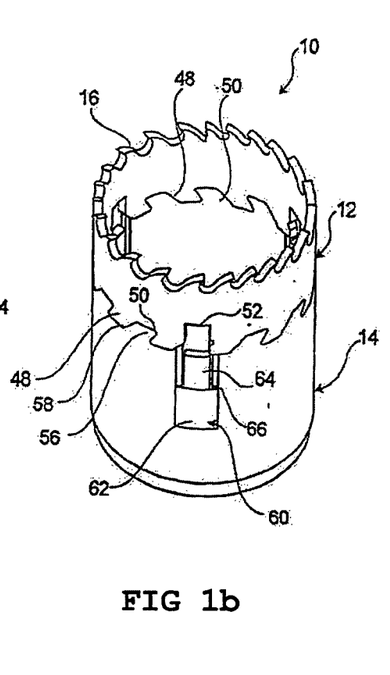
FIG. 1b illustrates a perspective view of a hole saw body and a hole saw blade in an inserted position.
Figure 1C:
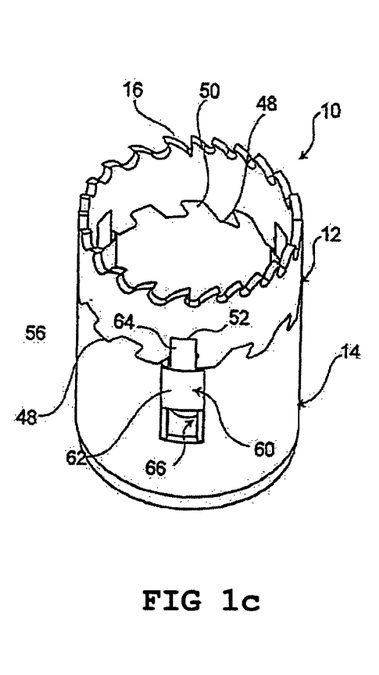
FIG. 1c illustrates a perspective view of a hole saw body and a hole saw blade in a locked position.

FIGS. 1a, 1b and 1c illustrate an embodiment of the present invention. The present invention includes a hole saw 10 there being means of retaining the hole saw blade portion 12 to the hole saw body portion 14. In this embodiment the hole saw blade portion 12 includes at one end at least one cutting element 16 and at the other end an engagement means by which the blade is attached to the hole saw body 14.

The engagement means on the hole saw blade 12 further includes at least one engagement lug 48 extending longitudinally from the flat edge 50 of the hole saw blade portion 12. Shown in this figure is a plurality of repeating teeth shaped engagement lugs 48 whereby the lug projects at an acute angle from the hole saw blade portion 12 with the angle of the leading edge of the lug 48 being greater than the angle of the trailing edge. The hole saw blade portion 12 further includes at least one substantially rectangular recession 52 with an angular depression 54 approximately about half way up the side wall of the rectangular recession. The attachment means on the hole saw body 14 is adapted to receive the abovementioned engagement means in a rotatable manner. The attachment means comprises of a plurality of engagement lugs 56, extending longitudinally from the end of the hole saw body 14, and adapted to be received in the space between the extending hole saw blade lugs 48.

To further retain the hole saw blade 12 to the hole saw body 14, the present embodiment utilises at least one retention clip 60 longitudinally slideable from a first to a second position. This additional retention device safeguards against the blade unintentionally being removed through misuse or rough handling. The retention clip includes a tab 62 which a user asserts force upon to slidably move the retention clip from a first to a second position. In doing so the extension strip 64 is moved up into the recess 52 provided in the hole saw blade 12. A projection 66 is adapted to be received by a depression 54 and ensures that the clip is retained in the second and locking position.

FIGS. 1b and 1c show the hole saw blade 12 and hole saw body 14 rotatably attached with the retention clip 60 in the first and second positions. The first position of the retention clip 60 allows the hole saw blade portion 12 to be inserted and removed from the hole saw body portion 14. In the second position the retention clip extends into the hole saw blade portion recess 52 thereby locking the hole saw blade to the hole saw body.

The retention clip 60 slides along longitudinally extending rails 68. These rails are formed by pressing the steel about the slot used to house the retention clip 60 in order to create a reduced thickness of the rails when compared with the thickness of the hole saw body 14. The reduced thickness of the rails allows the retention clip to be the same thickness as the body and as a result it does not protrude radially from the hole saw body 14. Thus allowing through-drilling applications and does not prevent drilling depth to be limited to only the depth of the hole saw blade portion 12.

Figure 2:
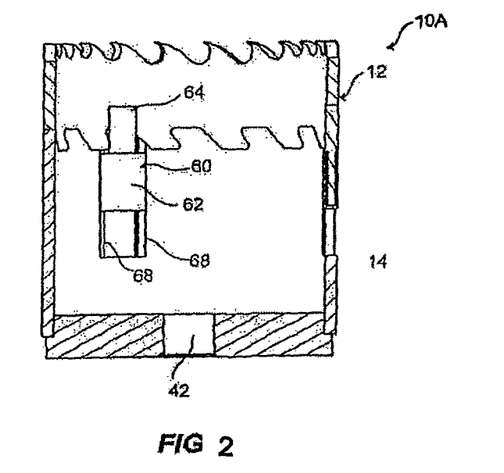
FIG. 2 illustrates a cross sectional view of a hole saw body and a hole saw blade in a locked position.
Figure 3:
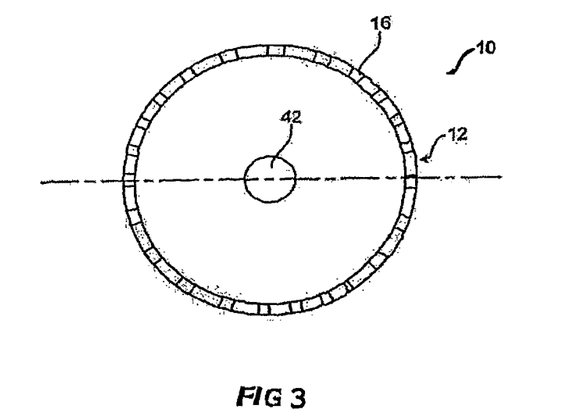
FIG. 3 illustrates a top view of a hole saw body and a hole saw blade in a locked position.

FIG. 2 illustrates a cross sectional view of the hole saw body portion 14 and the hole saw blade portion 12 locked together with the retention clip 60 in the second and locked position. FIG. 3 illustrates the same arrangement in a top view. Also not shown in this figure is the means of fixing the hole saw body to a mandrel or base.

It is important to understand that the present invention teaches a removable hole saw blade that is adapted to be removably attached to a hole saw body. The advantages of this is that the user only needs to have one hole saw body and several blades to be able to cut through a range of materials. Not only is this more space effective and cheaper but it has the result that once a hole saw blade has worn out it can be simply replaced and used with the original hole saw body. This has the effect on saving on materials and thus cost.

Figure 4:
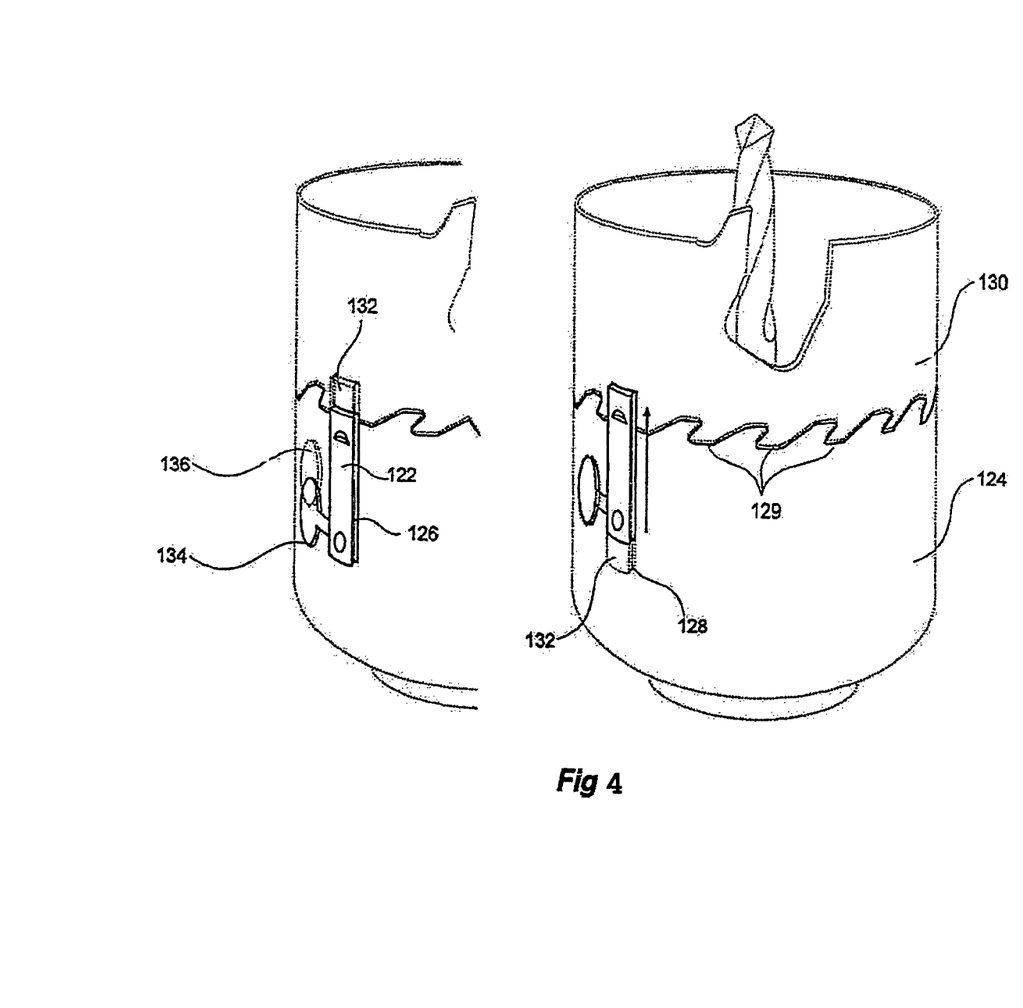
FIG. 4 illustrates a perspective view of a hole saw body and a further locking means of the hole saw blade.

One particular type of locking means is illustrated in FIG. 4. Here a slidable lug whose thickness is the same as the hole saw body 124 includes internally facing grooves 126 that engage a correspondingly shaped protrusion 128 of the hole saw body. The lug is thus restrained in place and can only move up or down to lock and unlock the hole saw blade 130, the lug sliding within aperture 132 defined both by the hole saw body and the hole saw blade. To ensure that once the lug has slid up and engaged blade 130 it remains in place and does not slide down a press stud 134 may be used that engages correspondingly shaped aperture 136 in the hole saw body and prevents the lug from sliding. To unlock the blade from the body the stud 134 may be depressed and then the lug slid down to unlock the blade from the body. Once the hole saw blade is attached to the body the configuration of the various lugs 129 that have non-parallel surfaces to the longitudinal axis of the hole saw body and blade ensures that the blade is firmly locked to the body and cannot disengage itself. Given that the various lugs are typically not symmetrical nor equally spaced around the blade a marker may be used on both the blade and the body (not shown) to assist in the user correctly positioning the blade on the body.

Yet other ways of locking the lug in place may be used including an embodiment where a groove may engage protruding pins and so on. It is not intended to limit the invention to a particular way of causing the locking to occur.

Figure 5:
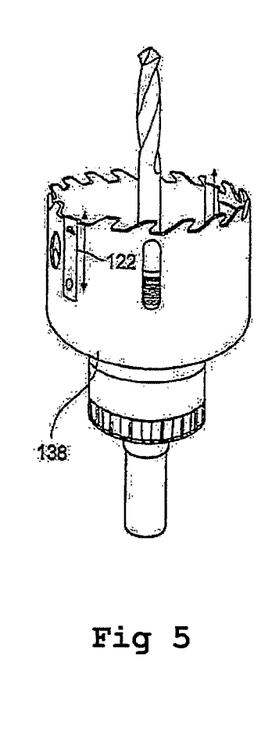
FIG. 5 illustrates the locking means of FIG. 4 without a hole saw blade.
Figure 6:
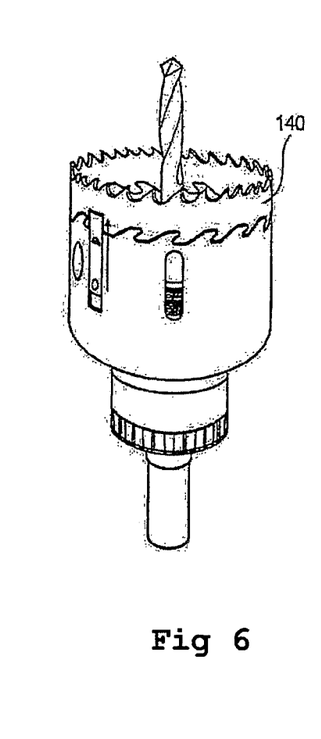
FIG. 6 illustrates the locking means of FIG. 5 with a steel hole saw blade attached and locked thereto.
Figure 7:
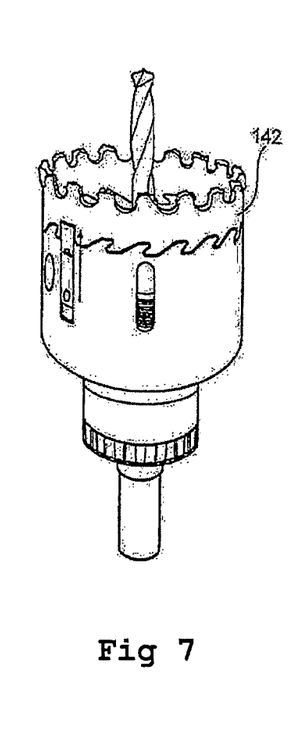
FIG. 7 illustrates the locking means of FIG. 5 with a concrete saw blade attached and locked thereto.
Figure 8:
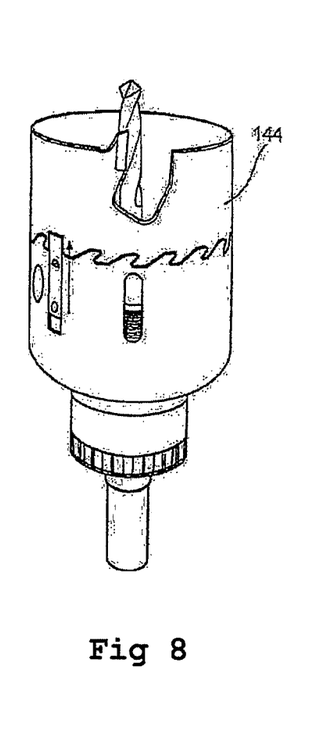
FIG. 8 illustrates the locking means of FIG. 5 with a timber hole saw blade attached and locked thereto.

FIG. 5 through to 8 illustrate the adaptation of different type of cutting blades FIG. 5 illustrating the hole saw body 138 with the locking mechanism 122 of FIG. 4, FIG. 6 illustrating a metal hole saw blade 140 attached to the body, FIG. 7 illustrating a concrete drilling blade 142 attached to the body 138 and FIG. 8 illustrating a timber drilling blade 144 attached to the body.

Figure 9:
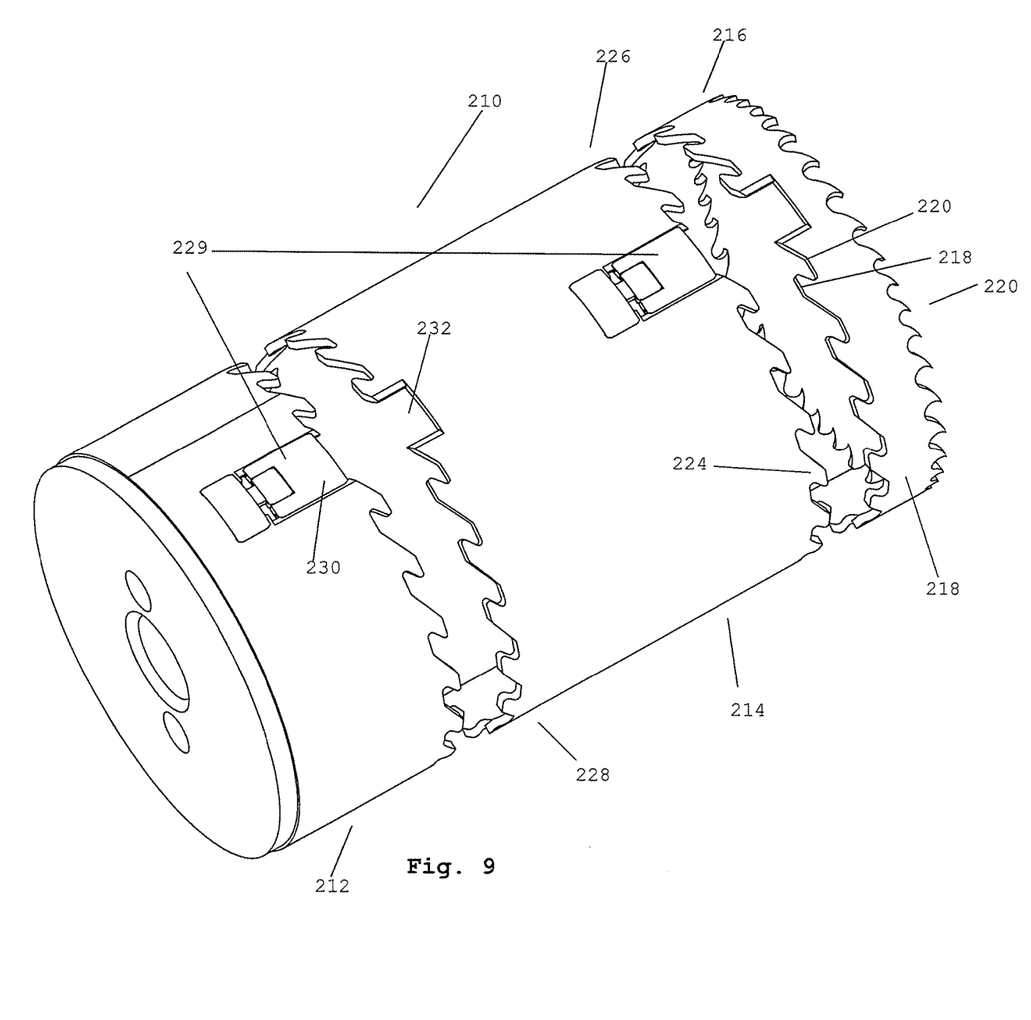
FIG. 9 is a perspective view of a further embodiment of hole saw assembly including a body, intermediate member and a hole saw blade in a disengaged position according to the present invention.
Figure 10:
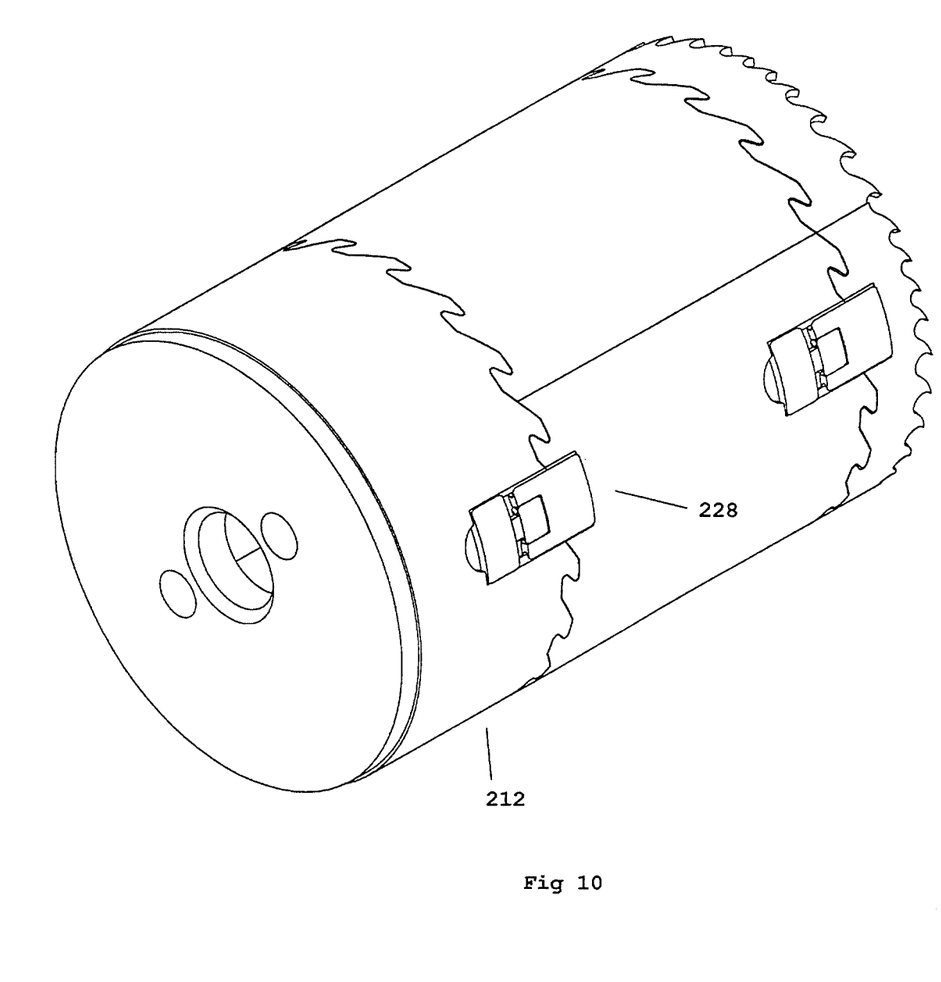
FIG. 10 is a perspective view of the hole saw assembly of FIG. 9 when in an assembled position.
Figure 11:
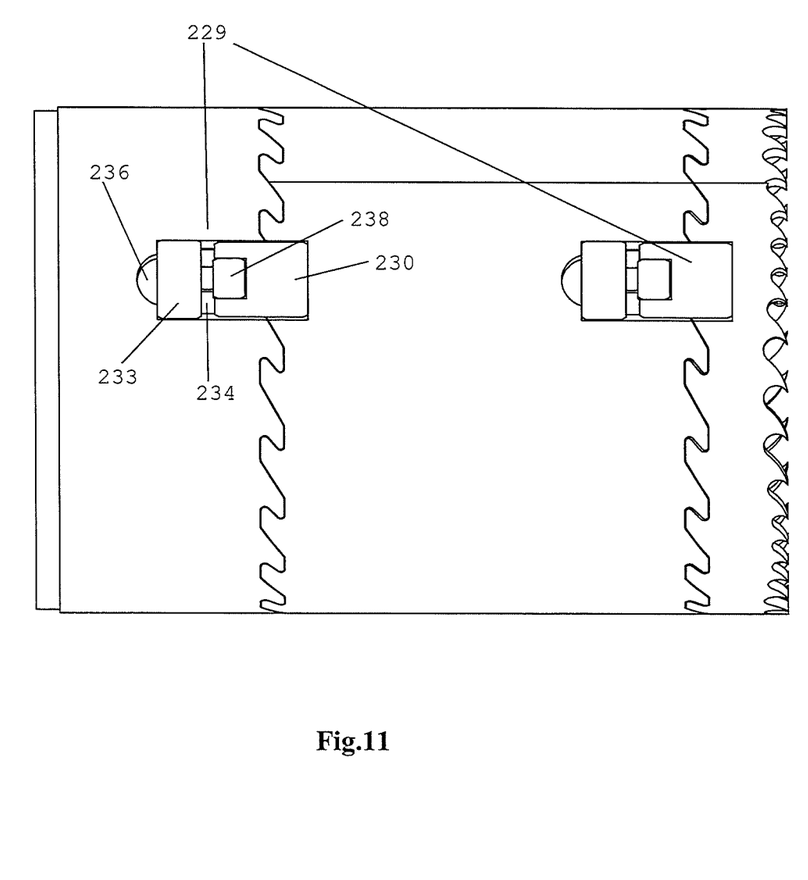
FIG. 11 is a side view of the hole saw assembly illustrated in FIG. 10.

FIGS. 9-11 illustrate a further embodiment of the present invention. Shown in the figures is a hole saw assembly 210 including a hole saw body 212, intermediate portion (extension piece) 214 and hole saw blade 216. The hole saw blade 216 includes a cylindrical body 218 with cutting teeth 220 at one end thereof. The arrangement of the cutting teeth differs for each application and in this embodiment shown is a hole saw blade 216 with a plurality of cutting teeth 220. However it is to be understood that the blade may have different cutting arrangements and teeth for different materials.

At the opposite end of the hole saw blade 216 is an engagement means by which the blade 216 can be attached to the intermediate portion 214. The engagement means is wave shaped including peaks 218 and troughs 220 in the blade that engage correspondingly shaped troughs 222 and peaks 224 in one end 226 of the intermediate portion 214. The peaks extend over the troughs so to connect the blade to the intermediate portion they have to be rotated with respect to each other. Once in that position the blade and the intermediate portion are locked to each other and can only be disengaged by rotating them relative to each other in the opposite direction.

In a similar manner the intermediate portion 214 can be attached at the other end 228 to the hole saw body 212. In case where the hole to be drilled is not deep at all, the intermediate portion can be dispensed with and the blade 216 directly attached to body 212.

In order to prevent the pieces form rotating with respect to each other locking means 229 are provided both in the body 212 and the end 226 of the intermediate portion 214. Typically there are two locking means in the blade and two in the intermediate portion. The locking means consists of a retention clip 230 longitudinally slideable from a first to a second position, illustrated in the first position in FIG. 9 and in the second position in FIGS. 10 and 11 where in the second position the clip 230 engages a recess 232 in the intermediate piece 214 or the blade 216. This prevents relative rotation of the intermediate portion to the body and relative rotation also of the blade to the intermediate portion. The clip 230 includes grooves on its sides that engage tapered rails on the side of the recess to prevent them from moving outwardly. However other arrangements may well be used. A tab 233 is attached to the clip 230 through a hinge 234 allowing the tab 233 to sit on the surface of the body in the first position. When the clip 230 is slid into the recess, the tab 233 is then pushed and clicked into the body 212 to prevent the clip 230 from sliding back. Obviously the size of the tab and the space in the body 212 that it is clicked into is such to allow such a snap-fit arrangement.

To assist in removing the tab 233 from the body 212, a small cut out 236 is employed so that the tab 233 may be prised out of engagement with the body 212 and then lifted to allow the clip 230 to be slid back.

The tab is securely attached to the clip through a plastic extension 38 that locks into a space (not shown) in the clip 230. Again it is to be understood that other ways of attaching the tab to the clip may equally well be employed.

It is important to understand that the present embodiment teaches a removable hole saw blade that is adapted to be removably attached to a hole saw body and whose length can also be increased by using an intermediate piece. The advantages of this is that the user only needs to have one hole saw body, one intermediate piece and several blades to be able to cut through a range of materials and of varying depths.

Not only is this more space effective and cheaper but it has the result that once a hole saw blade has worn out it can be simply replaced and used with the original hole saw body. This has the effect of saving on materials and thus cost.

The locking mechanism that locks the pieces to each other to the hole saw body is contained within the footprint of the piece, that is, does not protrude in any direction, enabling the hole saw to be used for deep drilling.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A hole saw assembly comprising:
   a hole saw blade comprising a cylinder having a first end and a second end;
   said hole saw blade having a longitudinal axis extending between the first and second ends;
   cutting teeth extending outwardly from the first end of the cylinder;
   lugs extending outwardly from the second end of the cylinder;
   a cylindrical hole saw body selectively engageable with the cylinder of the hole saw blade; wherein the hole saw blade extends longitudinally outwardly from a first end of the hole saw body when the hole saw body and hole saw blade are engaged;
   lugs extending outwardly from the first end of the hole saw body;
   at least one locking member provided on one of the hole saw body and the hole saw blade, wherein the at least one locking member is integral with the one of the hole saw body and the hole saw blade; and wherein the at least one locking member is selectively moveable in direction parallel to the longitudinal axis between a first unlocked position and a second locked position; and when the at least one locking member is in said first unlocked position, the hole saw blade is removable from the hole saw body and when the at least one locking member in said second locked position, the hole saw blade and hole saw body are lockingly engaged with each other and are prevented from moving longitudinally away from each other;
   wherein the cylinder defines a plurality of cavities on the second end thereof; and each cavity is complementary to one of the lugs extending outwardly from the first end of the hole saw body; and wherein the hole saw body defines a plurality of cavities on the first end thereof; and each cavity on the hole saw body is complementary to one of the lugs extending outwardly from the second end of the hole saw blade; and wherein each lug on one of the hole saw blade and the hole saw body extends into a corresponding cavity on the other of the hole saw blade and the hole saw body.

2. The hole saw as in claim 1, wherein:
   the cutting teeth on the hole saw blade extend longitudinally upwardly and are oriented at an angle relative to a direction of rotation of the hole saw blade; and
   the lugs on the hole saw blade extend generally longitudinally downwardly in the opposite direction to the cutting teeth.

3. The hole saw as in claim 2, wherein the cutting teeth on the hole saw blade are oriented at an angle relative to the direction of rotation of the hole saw blade; and the lugs on the hole saw blade are oriented at an angle relative to an opposite direction of rotation of the hole saw blade.

4. The hole saw as in claim 1, wherein the at least one locking member has an inner circumference and an outer circumference; and wherein the hole saw body and the at least one locking member inner and outer circumferences do not protrude radially from the inner and outer circumferences of the cylinder of the hole saw blade.

5. The hole saw as in claim 1 wherein the lugs on the hole saw blade and hole saw body engage in the cavities defined in the other of the hole saw blade and hole saw body upon rotational movement between the cylinder of the hole saw blade and the hole saw body; and the hole saw body and hole saw blade are secured together and are prevented from moving longitudinally relative to each other.

6. A hole saw assembly comprising:
a hole saw blade comprising a cylinder having a first end and a second end;
cutting teeth extending outwardly from the first end of the cylinder;
lugs extending outwardly from the second end of the cylinder;
a cylindrical hole saw body selectively engageable with the cylinder of the hole saw blade; wherein the hole saw blade extends outwardly from a first end of the hole saw body when the hole saw body and hole saw blade are engaged;
lugs extending outwardly from the first end of the hole saw body;
at least one locking member provided on one of the hole saw body and the hole saw blade, wherein the at least one locking member is integral with the one of the hole saw body and the hole saw blade; and wherein the at least one locking member is selectively moveable between a first unlocked position and a second locked position; and when the at least one locking member is in said first unlocked position, the hole saw blade is removable from the hole saw body and when the at least one locking member in said second locked position, the hole saw blade and hole saw body are lockingly engaged with each other and are prevented from moving away from each other;
wherein the cylinder defines a plurality of cavities on the second end thereof; and each cavity is complementary to one of the lugs extending outwardly from the first end of the hole saw body; and wherein the hole saw body defines a plurality of cavities on the first end thereof; and each cavity on the hole saw body is complementary to one of the lugs extending outwardly from the second end of the hole saw blade; and wherein each lug on one of the hole saw blade and the hole saw body extends into a corresponding cavity on the other of the hole saw blade and the hole saw body.

7. The hole saw as in claim 6, wherein:
the cutting teeth on the hole saw blade extend upwardly and are oriented at an angle relative to a direction of rotation of the hole saw blade; and
the lugs on the hole saw blade extend generally downwardly in the opposite direction to the cutting teeth.

8. The hole saw as in claim 7, wherein the cutting teeth on the hole saw blade are oriented at an angle relative to the direction of rotation of the hole saw blade; and the lugs on the hole saw blade are oriented at an angle relative to an opposite direction of rotation of the hole saw blade.

9. The hole saw as in claim 6, wherein the at least one locking member has an inner circumference and an outer circumference; and wherein the hole saw body and the at least one locking member inner and outer circumferences do not protrude radially from the inner and outer circumferences of the cylinder of the hole saw blade.

10. The hole saw as in claim 6 wherein the lugs on the hole saw blade and hole saw body engage in the cavities defined in the other of the hole saw blade and hole saw body upon rotational movement between the cylinder of the hole saw blade and the hole saw body; and the hole saw body and hole saw blade are secured together and are prevented from moving relative to each other.

* * * * *